March 10, 1959
J. P. LOPEZ ET AL
2,876,731
FOLDED BOX BLANK CRUSHING AND GLUING MACHINE
Filed April 8, 1957
9 Sheets-Sheet 7

INVENTORS.
JOHN P. LOPEZ.
ALFRED C. MONAGHAN.
BY
Dean Fairbank & Hirsch
ATTORNEYS March 10, 1959  J. P. LOPEZ ET AL  2,876,731
FOLDED BOX BLANK CRUSHING AND GLUING MACHINE
Filed April 8, 1957  9 Sheets-Sheet 9

INVENTORS.
JOHN P. LOPEZ.
ALFRED C. MONAGHAN.
BY
Dean Fairbank & Hirsch
ATTORNEYS

United States Patent Office 2,876,731
Patented Mar. 10, 1959

2,876,731

FOLDED BOX BLANK CRUSHING AND GLUING MACHINE

John P. Lopez, Westfield, and Alfred C. Monaghan, Union, N. J., assignors to Universal Corrugated Box Machinery Corporation, Linden, N. J., a corporation of New York Application April 8, 1957, Serial No. 651,485

16 Claims. (Cl. 118—44)

This invention relates to the art of corrugated box machinery and more particularly to a machine for crushing the connecting portions at the free ends of a folded box blank and applying glue thereto.

As conducive to an understanding of the invention, it is noted that where folding boxes are formed from an elongated sheet which has connecting portions at each end, at least one of which is a portion of one of the free ends of the sheet, which are overlapped and formed together as by gluing, if at least one of such connecting portions is not crushed prior to joining, the box blanks will not stack properly due to undue bulging at the connected portions thereof.

Where the crushing operation to the connecting portions is effected by advancing the sheet in extended flat condition between crushing rollers which have segmental cams thereon designed to contact only the connecting portions of the blank, in order to prevent crushing of the entire width of the free end of the sheet, which might cause improper bending of the joined corner when the complete box blank is opened, precise alignment must be made of such segmental cams and where various runs of blanks are made having connecting portions of different widths, the segmental cams must be changed requiring stoppage of the equipment with resultant inefficiency of operation.

It is accordingly among the objects of the invention to provide a machine of the above type which is relatively simple in construction, which will effect the crushing of only the connecting portions of the box blank without the need for segmental cams or the like and which may be used on runs of blanks having connecting portions of different width without need for adjustment of the equipment for this purpose.

According to the invention, the machine comprises a pair of parallel side conveyors between which the reversely bent ends of a folded box blank are positioned for advance through the crushing operation. A conveyor extending between the side conveyors and beneath the latter supports the bottom of the folded blank. The overlapping connecting portions at the free ends of the folded box blank are advanced between a pair of crushing rollers of width equal to that of the connecting portions and spaced by an amount which may be equal to the thickness of the sheet from which the blank is formed so that only the overlapping connecting portions will be crushed.

More specifically, the machine comprises means operative after the crushing operation has been effected, to space the connecting portions and to apply glue to the upper surface of the lower crushed connecting portion so that thereafter the two connecting portions may be joined together.

In another embodiment of the invention, where the connecting portions are a considerable portion of the width of the sheet, in order to prevent improper folding at the joined corners, only one of the connecting portions is crushed. To this end the first set of crushing rollers may be eliminated or spaced to be inoperative and another set of crushing rollers are provided positioned after the means to space such connecting portions and the equipment has means to advance only the lower connecting portion between the second set of crushing rollers so that when the connecting portions are thereafter joined, the box blank will fold only along the line of said crushed connecting portion.

In the accompanying drawings in which are shown one or more of various possible embodiments of the several features of the invention.

Figures 18, 27, 28:
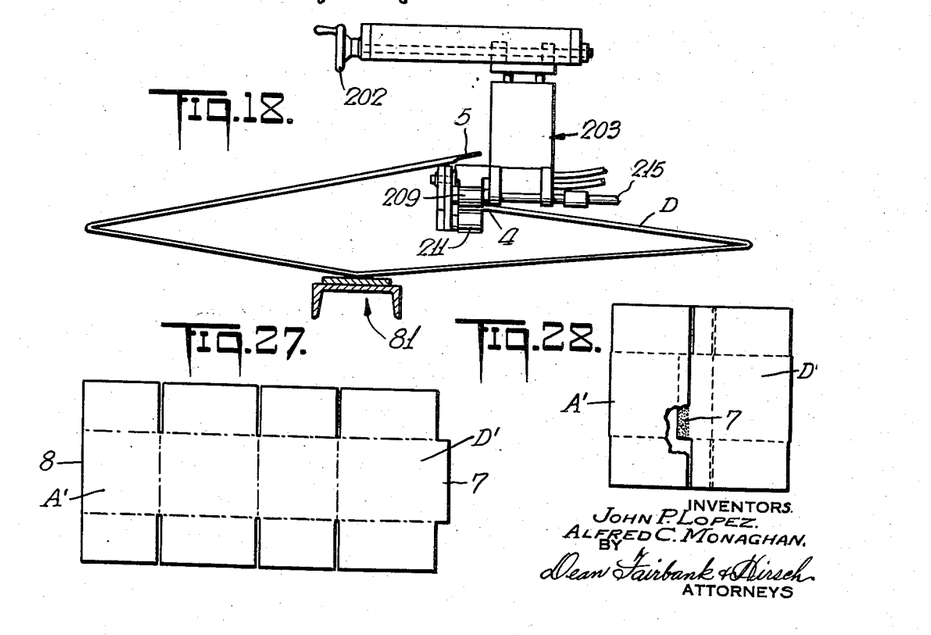
Fig. 27 is a plan view of another embodiment of the box blank in flat position.
Fig. 28 is a view similar to Fig. 27 of the box blank in folded condition.
Figures 24, 25, 26:
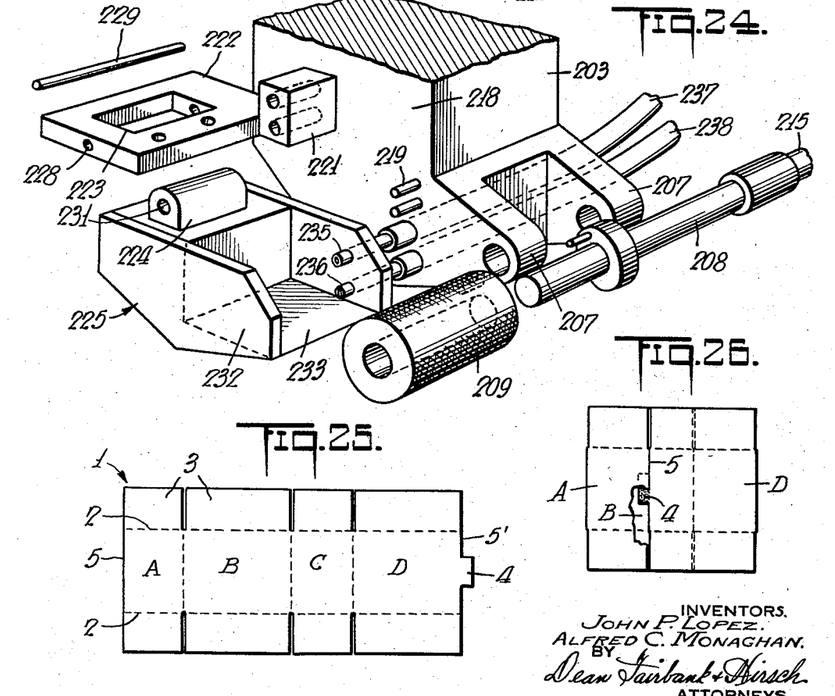
Fig. 24 is an exploded perspective view of the gluing mechanism.
Fig. 25 is a plan view of one embodiment of the box blank in flat positon.
Fig. 26 is a view similar to Fig. 25 of the box blank in folded condition.

Referring now to the drawings, the machine is designed to crush and glue complementary connecting portions at the free ends of a conventional box blank which may be of the type shown in Figs. 25 and 27.

Referring to Fig. 25, the box blank 1 comprises an elongated sheet having four rectangular panels A, B, C and D; panels A, C and B, D respectively being of the same dimension. The side edges 2 of the panels are suitably scored for ready folding thereof and each of said edges 2 has a rectangular flap 3 extending laterally therefrom. In addition, the end of panel D has a connector flap 4 formed integral therewith to which glue may be applied in the manner hereinafter to be described so that when the box blank is folded to the position shown in Fig. 26 the connector flap 4 will be positioned beneath the end 5 of panel A to be secured thereto.

The embodiment shown in Fig. 27 is similar to that shown in Fig. 25 and corresponding portions have the same reference numerals primed. The panel D' of box blank 6 has no connector flap, but the transverse dimension of panel D' is equal to that of panel D including its connector flap 4 so that the end 7 thereof itself may be secured to the end 8 of panel A' in the manner hereinafter to be described.

Figure 1:
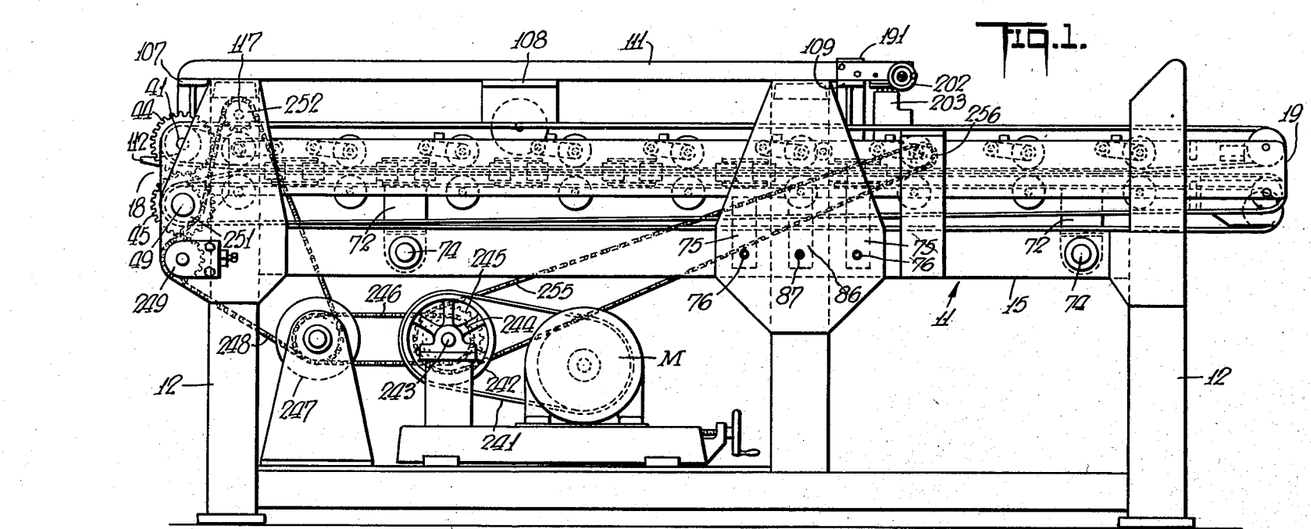
Fig. 1 is a side elevational view of the machine.
Figure 12:
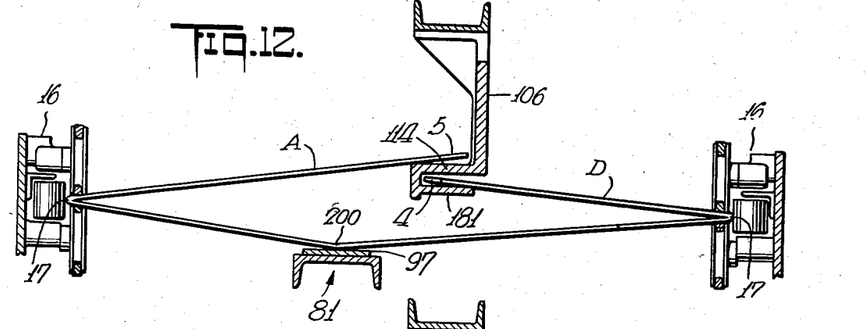
Fig. 12 is a transverse sectional view of the machine taken along line 12—12 of Fig. 6 with a box blank in position.

As shown in Fig. 1, the machine comprises a substantially rectangular frame 11 supported by standards 12 mounted on the floor. Extending between the side beams 15 of the frame 11 (Figs. 2 and 3) are identical parallel conveyors 16 which, as shown in Fig. 12 for example, support the reversely bent edges 17 of the box blank as it is advanced from the inlet 18 of the machine to the outlet 19 thereof.

As shown in Figs. 2, 3, 8 and 9, each of the conveyors 16 comprises an elongated substantially L-shaped beam 21 having a vertical side wall 22 at the lower edge of which is rotatably mounted a plurality of spaced pulleys 23, the stud shafts 24 on which said pulleys are mounted, extending laterally from the side wall 22 to support the pulleys in vertical position. Associated with each of the pulleys 23 is a corresponding plurality of pivotally mounted pulleys 25, each of which is mounted on a stud shaft 26 affixed to the end of a link 27 pivoted at its opposite end as at 28 to the side wall 22 of the beam 21, the pulley 25 also being in vertical position. The link 27 has a boss 31 projecting therefrom which mounts one end of a screw 32, the other end of which projects through an opening in a bar 33 affixed at one end to the upper edge of the side wall 22 of beam 21. A coil spring 34 encompasses the portion of screw 32 between boss 31 and bar 33 and a nut 35 is screwed on the end of the screw extending above the bar 33. Thus, by reason of the tension of spring 34, the link 27 and the pulley 25 thereon are urged downwardly, adjustment of the screw 32 permitting adjustment of the tension on the link 27.

Figure 2:
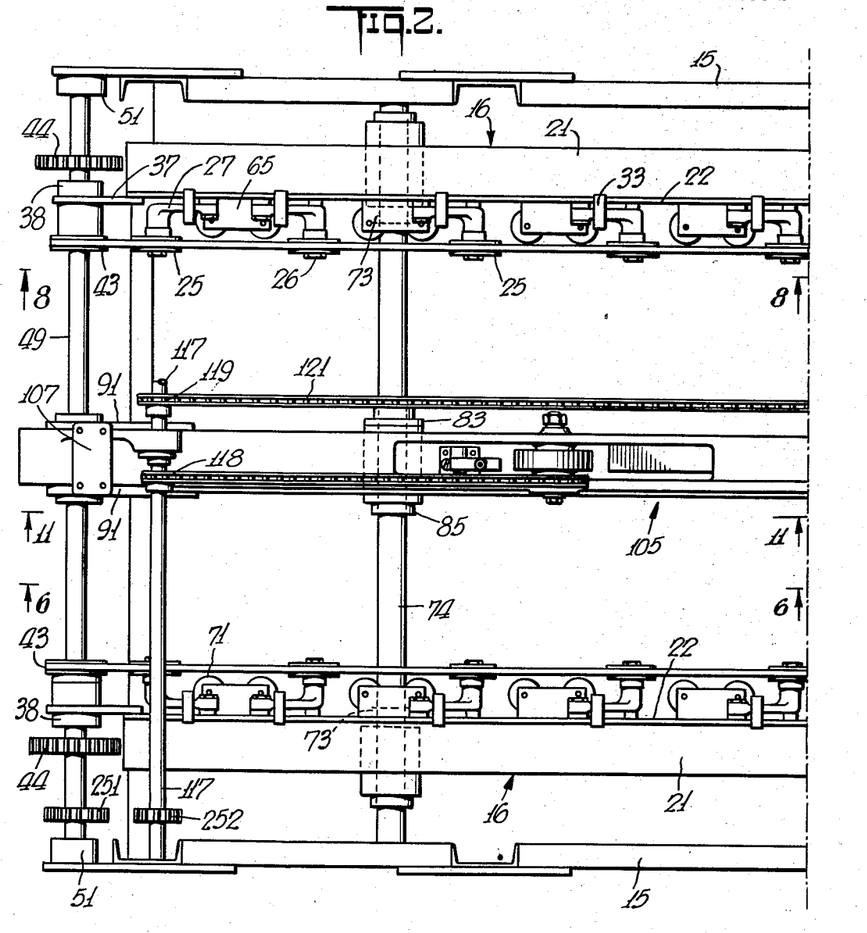
Figs. 2 and 3 are top plan views of the machine.
Figures 9, 10:
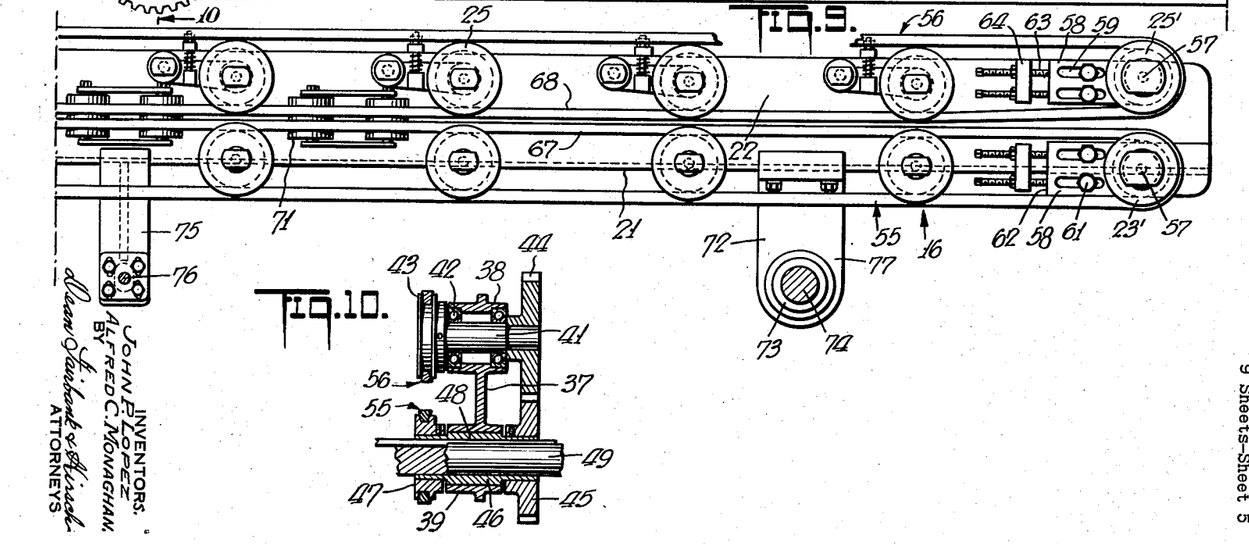
Fig. 9 is a view similar to Fig. 8 taken along line 9—9 of Fig. 3.
Fig. 10 is a vertical sectional view taken along line 10—10 of Fig. 8.

Affixed to the end of beam 22 adjacent the inlet 18 is a plate 37 which has vertically aligned hubs 38 and 39 as shown in Fig. 10. Extending through the upper hub 38 is a stud shaft 41 which is rotatably mounted in bearing 42. One end of the stud shaft 41 mounts a pulley 43 aligned with the upper pulleys 25. The other end of the stud shaft 41 mounts a gear 44 which meshes with a gear 45 affixed to one end of a bushing 46 which extends through the hub 39, the other end of the bushing having a pulley 47 affixed thereto. Extending through the bushing and splined thereto as at 48 is a shaft 49 rotatably mounted at each end in suitable bearings 51 (Fig. 2). Positioned on the beam 22 at the outlet end thereof are pulleys 23', 25' (Fig. 9) aligned respectively with the pulleys 23 and 25. The pulleys 23' and 25' are mounted so that they may be moved longitudinally along the beam 22 to maintain tension on the belts 55, 56 encompassing the pulleys 47, 23, 23' and 43, 25, 25' respectively. To this end, each of the pulleys 23', 25' is mounted on a stud shaft 57 affixed to a plate 58 which has a pair of parallel longitudinal slots 59 through which extend locking screws 61 which extend through threaded openings in a boss 64 extending laterally from wall 22. Thus, when the locking screws 61 are loosened and the screws 63 are adjusted, the position of the plate may be set as desired to adjust the tension on the associated belt.

Figure 8:
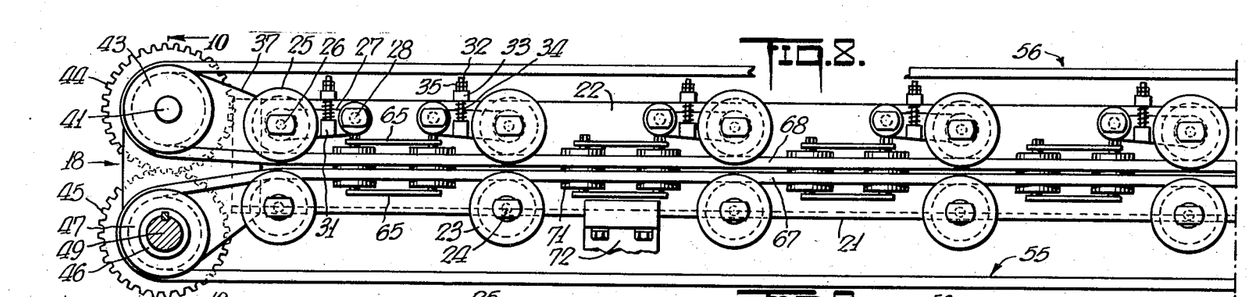
Fig. 8 is a side elevational view taken along line 8—8 of Fig. 2.

Affixed to the side wall 22 of the beam 21 as shown in Figs. 2 and 8 is a plurality of pairs of spaced brackets 65, the brackets of each pair being vertically spaced by a distance greater than that between the adjacent runs 67 and 68 of the belts 55 and 56.

Rotatably mounted between the brackets of each pair is a pair of vertical rollers 71 against which the edge 17 of the box blank will abut in the manner hereinafter described.

Means are provided to afford transverse adjustment of the conveyors 16. To this end each of the conveyors 16 has depending therefrom a pair of spaced brackets 72, each with a hub 73 at its lower end and shafts 74 mounted on the frame of the machine extend through transversely aligned hubs 73 of the conveyors to support the conveyors. Also depending from each of the conveyors 16 is a bracket 75 longitudinally offset from each other as shown in Fig. 1, the lower end of which has a threaded opening through which extends an associated adjustment screw 76. Thus upon rotation of the adjustment screws, the respective conveyors 16 may be independently moved transversely to desired position.

Figure 11:
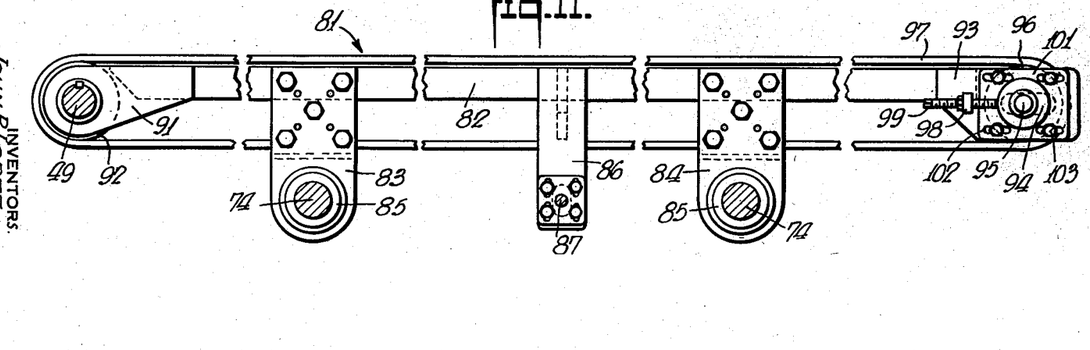
Fig. 11 is a side elevational view taken along line 11—11 of Figs. 2 and 3.

Extending the length of the machine between the conveyors 16 is the lower conveyor 81. As shown in Fig. 11 the lower conveyor comprises an elongated channel member 82 from which depends a pair of spaced brackets 83 and 84, each of said brackets having a hub 85 at its lower end through which the mounting shafts 74 extend to support the lower conveyor. Also depending from the channel member of the lower conveyor is a bracket 86 having a threaded opening at its lower end through which extends an adjusting screw 87.

Affixed to the sides of the channel member 82 adjacent the inlet 18 are plates 91 which have transversely aligned openings through which extends the drive shaft 49. Mounted on the shaft 49 between the plates 91 is a roller 92 which is splined to said shaft as shown in Fig. 11.

Affixed to the other end of channel member 82 are plates 93 (Figs. 3 and 11) which have transversely aligned elongated slots 94 through which extend a stud shaft 95 that mounts a roller 96, a belt 97 encompassing said rollers 92 and 96 as shown in Fig. 11. Means are provided to adjust the tension on the belt 97. To this end, each of the plates 93 has a lateral boss 98 through which extends a screw 99, the end of the screw abutting against the hub of an auxiliary plate 101 slidably mounted on the plate 93, the stud shaft 95 extending through said hub. Each of the auxiliary plates 101 has a plurality of longitudinal slots 102 through which locking screws 103 extend into threaded openings in the plates 93. Thus, with the locking screws loosened the screws 99 may be adjusted to apply tension to the belt and then the locking screws are tightened to retain the auxiliary plate and the stud shaft mounted thereon in set position.

Positioned between the side conveyors 16 above the lower conveyor 81 is the crushing roll supporting structure 105.

Figure 3:
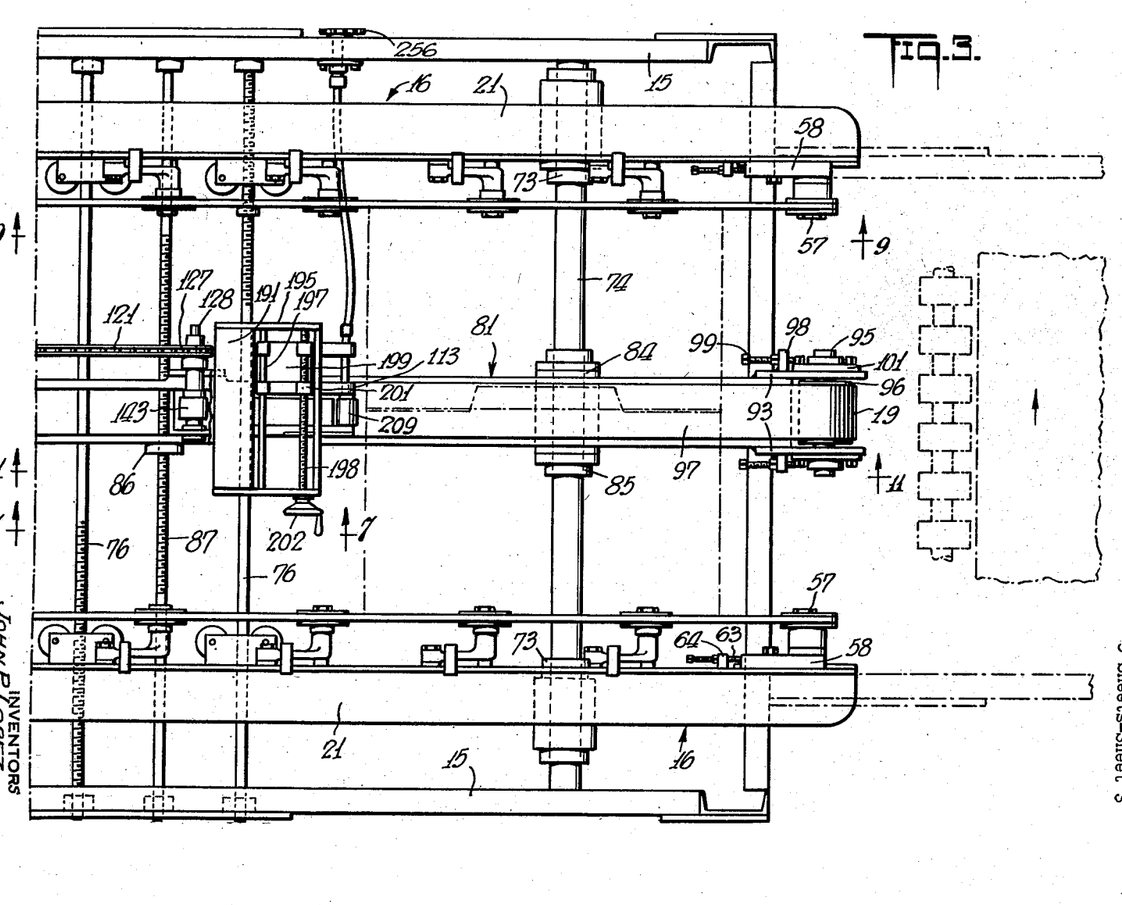
Figure 4:
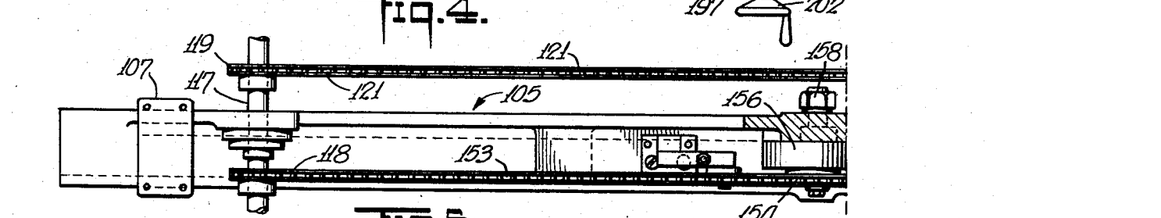
Figs. 4 and 5 are top plan views of the crushing rollers support.
Figure 19:
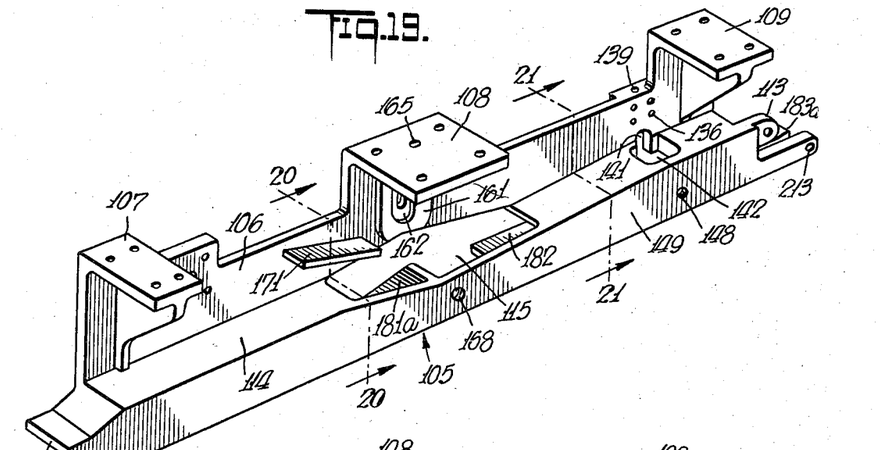
Fig. 19 is a perspective view of the crushing rollers support.

As shown in Fig. 19, the supporting structure comprises an elongated member having a side wall 106 with a plurality of lateral ledges, illustratively three in number, designated 107, 108, 109, extending at right angles therefrom. The ledges are secured in any suitable manner to a supporting beam 111 (Fig. 1) extending longitudinally of the machine midway between its sides and mounted in any suitable manner to the frame of the machine. The leading end 112 of the supporting structure 105 extends slightly beyond and above the inlet 18 of the machine as shown in Fig. 1 and the rear end 113 of the supporting structure is longitudinally spaced from the outlet end 19 of the machine as shown in Fig. 3.

The supporting structure at the lower edge of wall 106 has a ledge 114 (Fig. 19) extending substantially the length thereof at right angles to the wall 106, said ledge having an elongated cutout 115 therein below the middle supporting ledge 108. The side wall 106 of the supporting structure adjacent the ledge 107 has an opening 116 through which extends a shaft 117. The shaft 117 extends transversely across the machine (Fig. 2) and has sprocket wheels 118 and 119 affixed thereto on each side respectively of the side wall 106.

Encompassing the sprocket wheel 119 is a sprocket chain 121 which rides over an idler sprocket wheel 122

Figure 7:
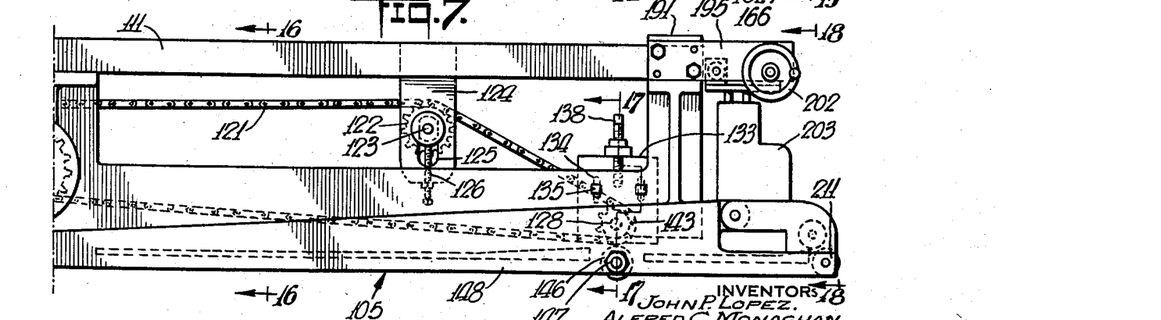
Fig. 7 is a view similar to Fig. 6 taken along line 7—7 of Fig. 3.

(Figs. 5 and 7) mounted on a shaft 123 extending laterally from a bracket 124 depending from the supporting beam 111. As is clearly shown in Fig. 7, the bracket 124 has an elongated slot 125 through which the shaft extends and a screw 126 extending through the bracket permits vertical adjustment of the position of the shaft to take up slack in the sprocket chain 121.

Figure 5:
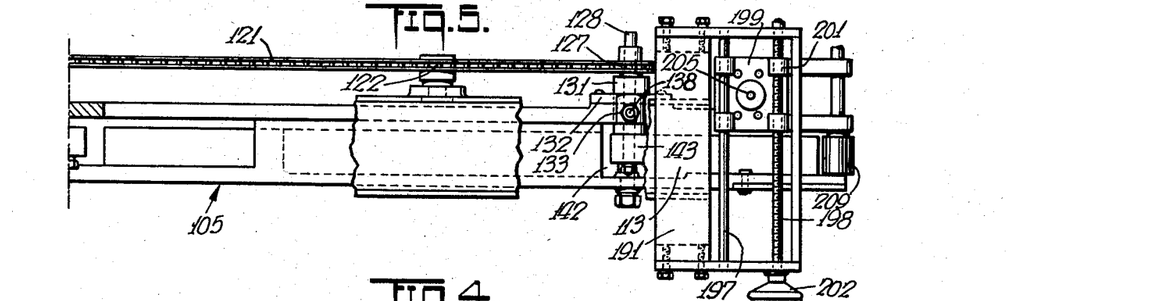

The sprocket chain 121 also encompasses a sprocket wheel 127 affixed on a stud shaft 128 as shown in Fig. 5. The stud shaft 127 exends through a bushing 131 carried on a plate 132 which has a lateral lip 133 at its upper edge extending over the upper edge of wall 106. The lip has a threaded opening through which a screw 138 extends, the screw being rotatably mounted in a suitable opening 139 (Fig. 19) in the upper edge of the side wall 106. The plate 132 has parallel elongated slots 134 through which extend screws 135 that are secured in threaded openings 136 in wall 106 so that when screws 135 are loosened and screw 138 turned, vertical adjustment of plate 132 is provided.

The stud shaft 128 is aligned with an elongated vertical opening 141 in the side wall of the supporting structure 105 and extends through such opening, the ledge 114 having a cutout portion 142 aligned with such opening 141. Affixed to the end of the stud shaft and aligned with said cutout 142 is a crushing roller 143 which is vertically aligned with a second crushing roller 146 positioned directly therebeneath and mounted on a shaft 147 extending through an opening 148 in the skirt 149 of the elongated member depending from the elongated ledge 114.

It is apparent by adjustment of the screw 138, the upper crushing roller 143 may be moved away from the idler crushing roller 146 to adjust the spacing between said rollers.

The shaft 117 also mounts the sprocket wheel 118 previously described which is engaged by a sprocket chain 153 that also engages a sprocket wheel 154 affixed on a shaft 155. Also affixed on said shaft is a crushing roller 156 aligned with the cut away portion 115 in the elongated ledge 114 of the elongated supporting structure 105.

The shaft 155 extends through an elongated slot 157 in wall 106 and is secured at its outer end as by a nut 158. Encompassing the elongated slot 157 in wall 106 is a hub 161 which has an elongated depression 162 therein through which the elongated slot 157 extends. A follower member 163 (Fig. 15) is positioned in said slot and has an opening through which the shaft 155 extends. Rotatably mounted at one end to the follower is a screw 164 which extends through a threaded opening 165 in the ledge 108 and an aligned opening in the beam 111. Thus, when the screw 164 is rotated the follower will be raised and lowered to correspondingly raise and lower the crushing roller 156 and the sprocket wheel 154 carried thereon. The crushing roller 156 is vetically aligned with an idler crushing roller 166 mounted on a shaft 167 extending through an opening 168 in the skirt 149 of the elongated member.

Figure 6:
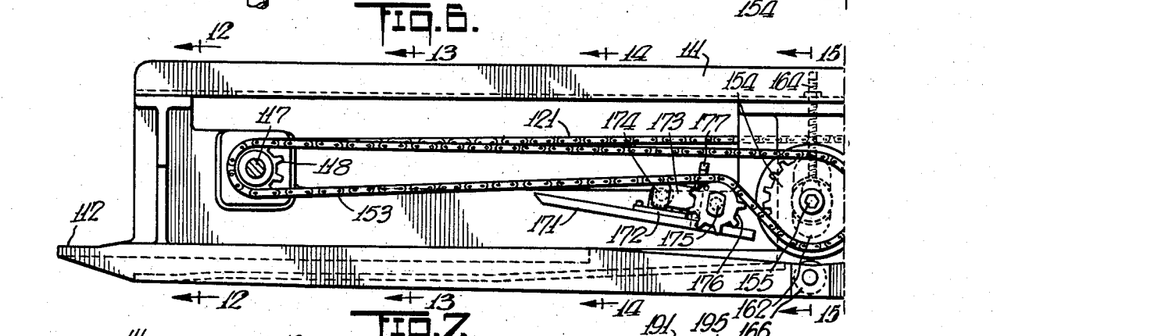
Fig. 6 is a side elevational view taken along line 6—6 of Fig. 2.

The wall 106 of the elongated member has a substantially rectangular plate 171 extending laterally therefrom and inclined at an angle, said inclination being downwardly from the inlet 18 towards the outlet 19. The plate as shown in Fig. 19 is between the inlet end 18 of the elongated member and the elongated cutout 115. Secured to said plate is a bracket 172 (Fig. 6) to which a link 173 is pivotally mounted as at 174. The free end of the link has a stud shaft 175 on which a sprocket wheel 176 is mounted, the sprocket chain 153 encompassing sprocket wheels 118 and 154 riding over said sprocket wheel 176. The link 173 has a threaded substantially vertical bore through which extends a screw 177 so that upon rotation of the screw the link may be moved to take up slack in the sprocket chain 153.

Figures 20, 21, 22:
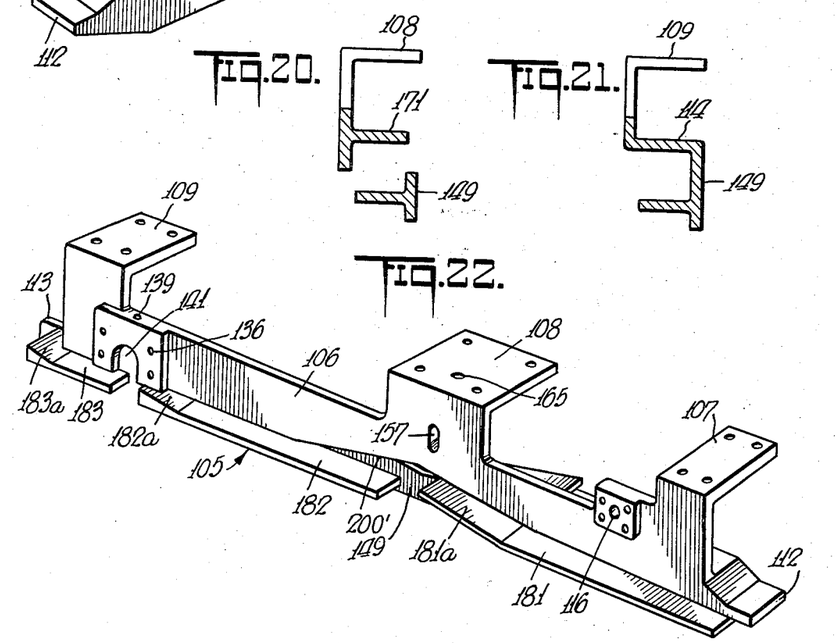
Fig. 20 is a transverse sectional view taken along line 20—20 of Fig. 19.
Fig. 21 is a view similar to Fig. 20 taken along line 21—21 of Fig. 19.
Fig. 22 is a view similar to Fig. 19 taken from the rear of the support.

In addition to the ledge 114, the elongated supporting member has a lateral flange formed from three sections 181, 182, 183 extending rearwardly from substantially the lower edge of skirt 149. As shown in Fig. 22, section 181 extends from near the leading edge 112 of the supporting member in a horizontal plane toward the cutaway portion 115 and then is inclined upwardly as at 181a. The section 182 is longitudinally spaced from said section 181 and extends in a horizontal plane to the cutout 142 where it is also inclined upwardly as at 182a. The section 183 is longitudinally spaced from said section 182 and extends in a horizontal plane toward the outlet end 113 of the supporting member being inclined upwardly adjacent such outlet end as at 183a.

Figure 23:
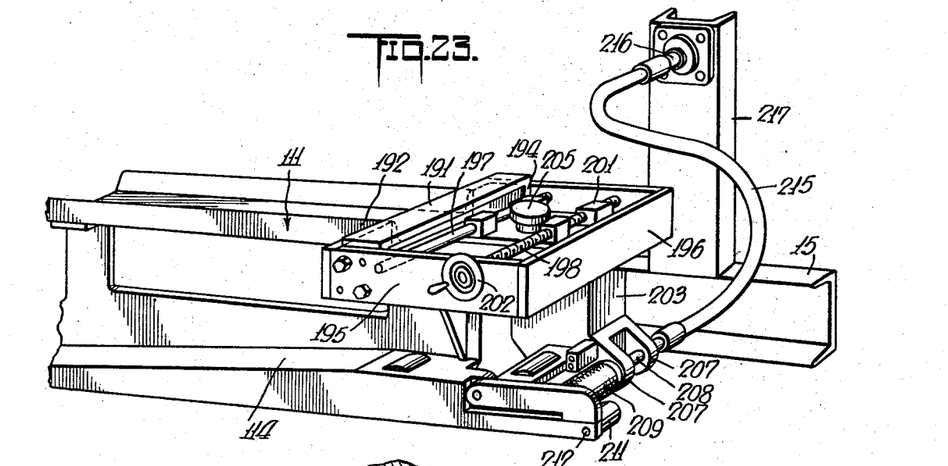
Fig. 23 is a fragmentary perspective view showing the gluing machanism.

Means are provided to apply glue to one of the connecting portions of the box blank. To this end, as shown in Figs. 5 and 23, a U-shaped bar 191 is secured to the end 192 of beam 111 extending transversely thereacross. Secured to the depending legs 194 of the bar 191 are side plates 195 to the ends of which is secured a transverse cross piece 196.

Extending between the side plates 195 are rods 197 and 198, the latter being threaded and rotatably mounted in the plates 195. The rods 197, 198 support a bracket 199 which has aligned bosses 201 at each corner through which the rods 197, 198 extend, the bosses accommodating the threaded rod 198, being correspondingly threaded so that upon rotation of threaded rod 198 as by handwheel 202 the bracket may be moved transversely with respect to the machine.

Suspended from the bracket 199 is a support 203 guided in any suitable manner for vertical movement from bracket 119. A screw 205 extends through the bracket into a threaded opening in the support to permit vertical adjustment of the latter.

The lower end of the support has a pair of ears 207 (Fig. 24) each with an opening through which extends a stud shaft 208, one end of the latter having a glue roller 209 mounted thereon, said roller being adapted to be positioned directly over an idler roller 211 rotatably mounted on a stud shaft 212 extending laterally from opening 213 at the end 113 of the supporting structure 105.

The other end of shaft 208 is connected by a flexible cable 215 to a stud shaft 216 mounted on a post 217 rising from side beam 15.

The side wall 218 (Fig. 24) of support 203 may have a plurality of dowel pins 219 which extend into a block 221 which has an associated plate 222 rigid therewith. The plate 222 has a rectangular slot 223 through which extends an elongated boss 224 formed on a glue tank 225 to secure the glue tank 225 to the plate 222, the latter having a bore 228 through which extends a pivot pin 229, the latter also extending through a bore 231 in said boss 224.

The tank 225 has side walls 232 and a floor 233. The ends of the side walls 232 straddle the roller 209 and one of the walls has openings 235, 236 through which extend tubes 237 and 238, the latter passing through the support to provide for a glue inlet and outlet respectively.

Means are provided to drive the shaft 49 to rotate the gears 44, 45 and pulleys 43, 47 so that the lower runs of the belts 55, 56 will move from the inlet toward the outlet, and also to drive the crushing rollers 156 and 143 as well as the glue roller 209. To this end as is shown in Fig. 1, a drive motor M is provided which, through belt 241 drives a pulley 242 mounted on a shaft 243 which also mounts sprocket wheels 244 and 245. The sprocket wheel 245 through sprocket chain 246 and clutch 247 drives a sprocket chain 248. Thus, the drive to sprocket chain 248 may be stopped even though the motor M is still rotating for the purpose hereinafter described. The sprocket chain 248 rides over an idler sprocket wheel 249 and meshes with a sprocket wheel 251 (Fig. 2) affixed on shaft 49 and a sprocket wheel 252, affixed on shaft 117. Thus upon rotation of the sprocket chain 248, the shaft 49 will be rotated to rotate gears 44 and 45 to drive the belts 55, 56 and the shaft 112 will be rotated to drive the crushing rollers 143, 156.

The sprocket wheel 245 is connected by sprocket chain 255 to a sprocket wheel 256 mounted on shaft 216 to drive the glue roller 209 (Fig. 23).

By reason of the clutch 247 when advance of the box blanks is to be stopped by opeartion of the clutch, the glue roller 209 will still be driven to prevent drying of glue thereon.

Operation

Where the equipment hereinabove described is intended to crush the flap 4 of the box blank shown in Fig. 25 and the associated portion of the panel A thereof, the screw 138 (Fig. 7) controlling crushing roller 143 is turned to space the rollers 143, 146 so that no crushing pressure will be exerted.

The screw 164 controlling crushing roller 156 is turned to space such roller from the associated roller 166 by a distance equal to the thickness of the sheet from which the box blank is formed.

The side conveyors 16 are adjusted transversely by rotation of screws 76 so that with the lower crease 200 of the box blank between panels B and C resting on conveyor belt 97 which is set to the desired transverse position by adjustment of screw 87, the reversely bent side edges 17 of the box blank may be positioned between the adjacent runs 67 and 68 of belts 55, 56 and such edges 17 will abut against the vertical rollers 71.

With the drive motor M energized, through the sprocket chains 241, 246 and 248, the gears 44 and 45 will be rotated in direction to advance the adjacent runs 67 and 68 of belts 55, 56 from the inlet 18 of the machine toward the outlet 19 thereof. In addition, these sprocket chains will drive gear 252 (Fig. 2) to rotate the shaft 117 and the sprocket wheels 118 and 119 thereon.

With the belts 55, 56 moving in the direction previously described, the folded box blank is inserted into the inlet 18 of the machine so that the lower crease 200 will rest on center conveyor belt 97 with the side edges 17 of the box blank positioned between belts 55, 56 abutting against the rollers 71. In addition, as shown in Fig. 12 the edge portion 5 of panel A of the box blank is located on the elongated ledge 114 and the edge 5' of panel D is positioned on ledge 181 below the elongated ledge 114.

Figures 13, 14, 15:
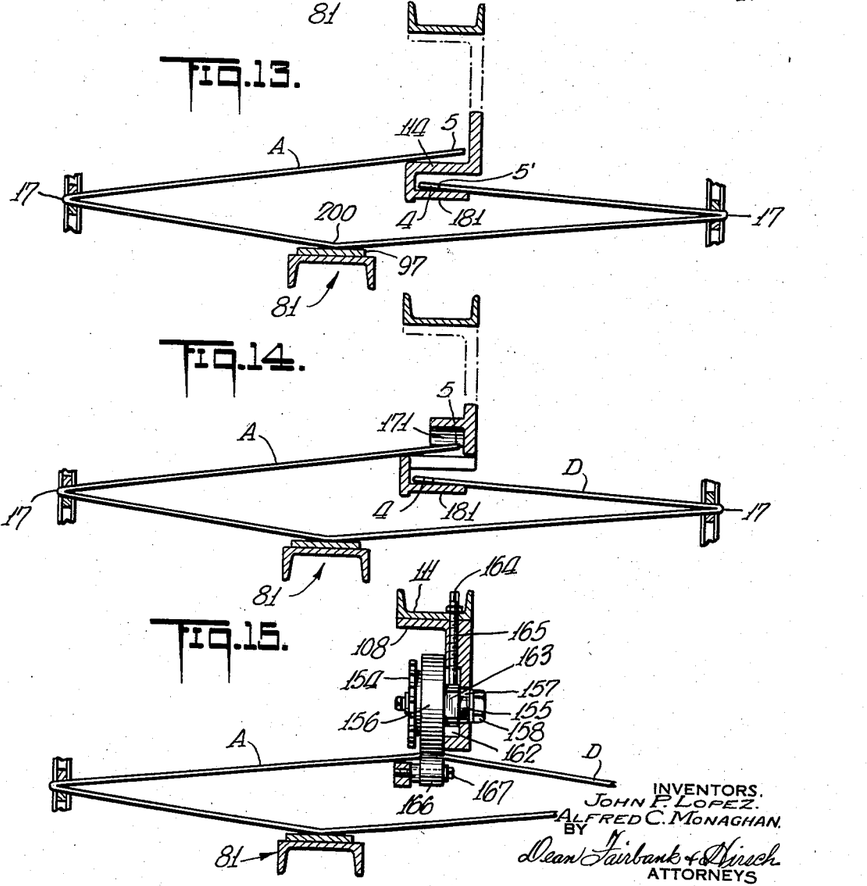
Figs. 13, 14 and 15 are views similar to Fig. 12, taken along lines 13—13, 14—14 and 15—15 of Fig. 6.

As the box blank is advanced by the lower conveyor 81 and the side conveyors 16, it will pass from the positions shown in Figs. 12, 13 and 14 to the position shown in Fig. 15.

Figure 16:
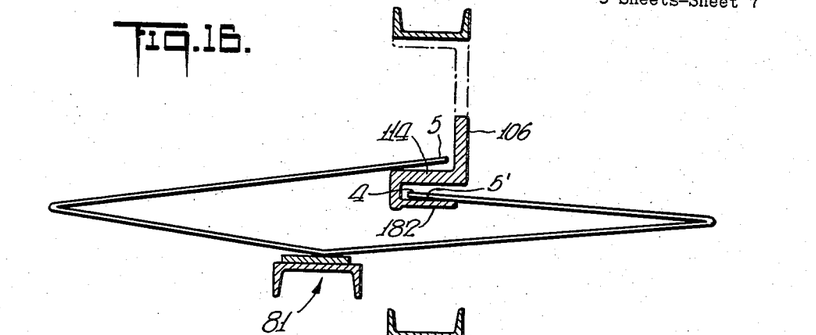
Fig. 16 is a transverse sectional view of the machine taken along line 16—16 of Fig. 7 with a box blank in position.

In this position the flap 4 of the panel D will be cammed upwardly by the upwardly inclined portion 181a of ledge 181 so that both the edge 5 of the panel A and the flap 4 of panel D will pass between the idler crushing roller 166 and the crusher roller 156, which is driven by the drive imparted to the associated sprocket wheel 154 through sprocket chain 153 and sprocket wheel 118 on driven shaft 117. As the spacing between crushing rollers 156 and 166 is equal to the thickness of the sheet from which the box blank is formed, it is apparent that only when the flap 4 is aligned with the crushing rollers will such flap and the corresponding portion of the edge 5 of panel A be crushed to a thickness equal to the thickness of the sheet and no other portion of the panel will be so crushed. After such crushing action has occurred, with continued advance of the box blank from the position shown in Fig. 15 to the position shown in Fig. 16, the edge 5 of the panel A will continue to ride along the elongated ledge 114 and the edge 5' of the panel D will be cammed downwardly by the downwardly inclined surface 200' (Fig. 22) of the wall 106 and will ride on the ledge 182 with the free edges 5 and 5' spaced from each other.

Figure 17:
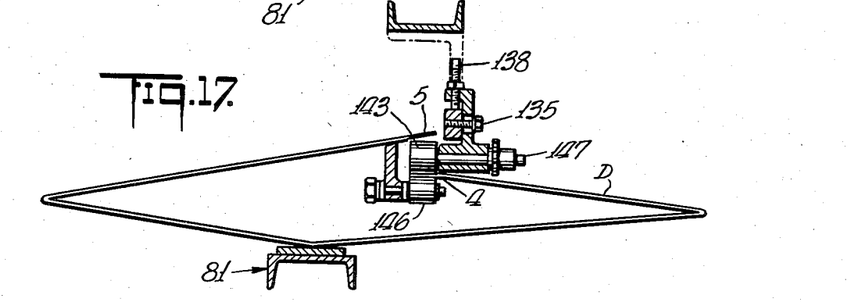
Figs. 17 and 18 are views similar to Fig. 16 taken along lines 17—17 and 18—18 of Fig. 7.

Although the rollers 143, 146 in Fig. 17, are shown in crushing position, this figure is intended to illustrate the use of the equipment for box blanks of the type shown in Fig. 27. Hence, when the equipment is used for box blanks of the type shown in Fig. 25, as presently described, as the box blank advances from the position shown in Fig. 16 to the position shown in Fig. 17, inasmuch as the second set of crushing rollers have been adjusted as previously described so that the upper crushing roller 143 is spaced from the lower crushing roller 146, as the edge 5' of the panel D is cammed upwardly by the inclined portion 182a of the ledge 182, it will move between the crushing rollers 143 and 146 without any crushing action being imparted to the flap 4.

Further movement of the box blank from the position shown in Fig. 17 toward the position shown in Fig. 18 will advance the flap 4 of panel D between the driven glue roller 209 and the idler glue roller 211.

As roller 209 is driven from flexible shaft 215 and shaft 217, glue will be picked up from glue tank 225 and applied to the upper surface of flap 4 which is spaced from the edge 5.

Thereupon, the box blank will be ejected from the machine and fed into a suitable equipment (not shown) which may be a squaring equipment of the type shown in co-pending application Serial No. 620,841, filed November 7, 1956, which will square the folded box blank and apply pressure to the complementary connecting portions so that the glue will set properly for adhesion of such connecting portions.

Where the box blank is of the type shown in Fig. 27 and it is desired to crush only the edge 7 of the panel D, the crushing roller 156 (Fig. 15) is adjusted by screw 164 so that it is sufficiently spaced from roller 166 so that no crushing action will be effected.

The crushing roller 143 (Fig. 17) is adjusted so that it is spaced a desired distance from roller 146, say half the thickness of the panel so that when the edge 7 of panel D passes between rollers 143, 146 it will be crushed the desired amount. Thereupon glue is applied to the upper surface of edge 7 in the manner previously described.

With the equipment above described, dependable crushing will be effected of only the desired portions of the box blank without need for cams and intricate adjustment and without need for stoppage of the equipment for replacement of cams when runs of box blanks having connecting portions of different dimensions are used.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A crushing machine for a folded box blank of the type having reversely bent side edges and complementary overlapping connecting portions comprising a pair of parallel conveyors for supporting the side edges of the blank to advance the latter, a support between said parallel conveyors extending parallel thereto for the bottom of said box blank, and a pair of vertically spaced crushing rollers mounted on axes at right angles to said parallel conveyors between which at least one of the connecting portions of the blank is advanced to effect crushing of such connecting portion.

2. The combination set forth in claim 1 in which said support comprises a conveyor on which rests the bottom of said box blank.

3. The combination set forth in claim 1 in which means are provided to vary the spacing between said parallel conveyors to accommodate box blanks of different widths.

4. The combination set forth in claim 1 in which means are provided to vary the transverse distance between said support and at least one of said conveyors.

5. The combination set forth in claim 1 in which means are provided to apply glue to one of the surfaces of one of said connecting portions after said one of the connecting portions has been crushed.

6. The combination set forth in claim 1 in which means are provided to effect vertical spacing of said connecting portions after crushing of said one of said connecting portions and means to apply glue to the upper surface of the lowermost connecting portion after such crushing operation.

7. The combination set forth in claim 1 in which means are provided to advance both of said connecting portions between said crushing rollers.

8. The combination set forth in claim 1 in which means are provided to effect vertical spacing of said connecting portions and to advance only the lowermost connecting portion between said crushing rollers.

9. A crushing machine for a folded box blank of the type having reversely bent side edges and complementary overlapping connecting portions, said machine comprising a pair of parallel conveyors for supporting the side edges of such box blank, a lower conveyor between said side conveyors extending parallel thereto for the bottom of such box blank, an elongated support between said side conveyors extending parallel thereto and lying in a plane above the lower conveyor, a pair of vertically spaced crushing rollers mounted on said support on axes at right angles thereto, and means to actuate said conveyors and said crushing rollers for advance of at least one of the connecting portions between said crushing rollers to effect crushing of such portion.

10. The combination set forth in claim 9 in which each of the parallel conveyors comprises a pair of continuing vertically aligned belts and drive means for said belts mounted on a horizontal axis at right angles to said conveyor.

11. The combination set forth in claim 9 in which each of said parallel conveyors comprises an elongated member having two rows of longitudinally spaced vertically aligned pulleys thereon, each of said pulleys being mounted on a horizontal axis, an endless belt encompassing the pulleys of each of said rows with adjacent runs of said belts extending substantially parallel to each other, and means to drive said belts.

12. The combination set forth in claim 11 in which a plurality of rollers are mounted on said elongated members, said rollers being mounted on vertical axes between the belts and the supporting member and substantially aligned with the adjacent runs of said belts whereby the side edges of said box blank when advanced by said belts will ride along said rollers.

13. The combination set forth in claim 11 in which supporting rods are provided extending at right angles to said conveyors, means slidably mounting said conveyors on said supporting rods for movement of said conveyors at right angles to said rods and means to effect such movement of the conveyors to vary the transverse spacing therebetween.

14. The combination set forth in claim 9 in which each of said parallel conveyors comprises an elongated member having two rows of longitudinally spaced vertically aligned pulleys thereon, each of said pulleys being mounted on a horizontal axis, an endless belt encompassing the pulleys of each of said rows with adjacent runs of said belts extending substantially parallel to each other, a shaft extending transversely across the machine at right angles to said elongated members, the endmost pulley of one of the rows of each conveyor being operatively connected to said shaft and means to rotate said shaft.

15. The combination set forth in claim 14 in which a bushing is rotatably mounted in each of said elongated members, said shaft extends through said bushing and is splined thereto to permit movement of said elongated member and bushing at right angles to said shaft and said endmost pulleys are mounted on said bushing.

16. The combination set forth in claim 9 in which means are provided to effect relative vertical movement of said crushing rollers to vary the spacing therebetween.

References Cited in the file of this patent
UNITED STATES PATENTS

| | | |
|---|---|---|
| 2,637,251 | Spiess | May 5, 1953 |
| 2,764,918 | La Bombard | Oct. 2, 1956 |